Figure 1:
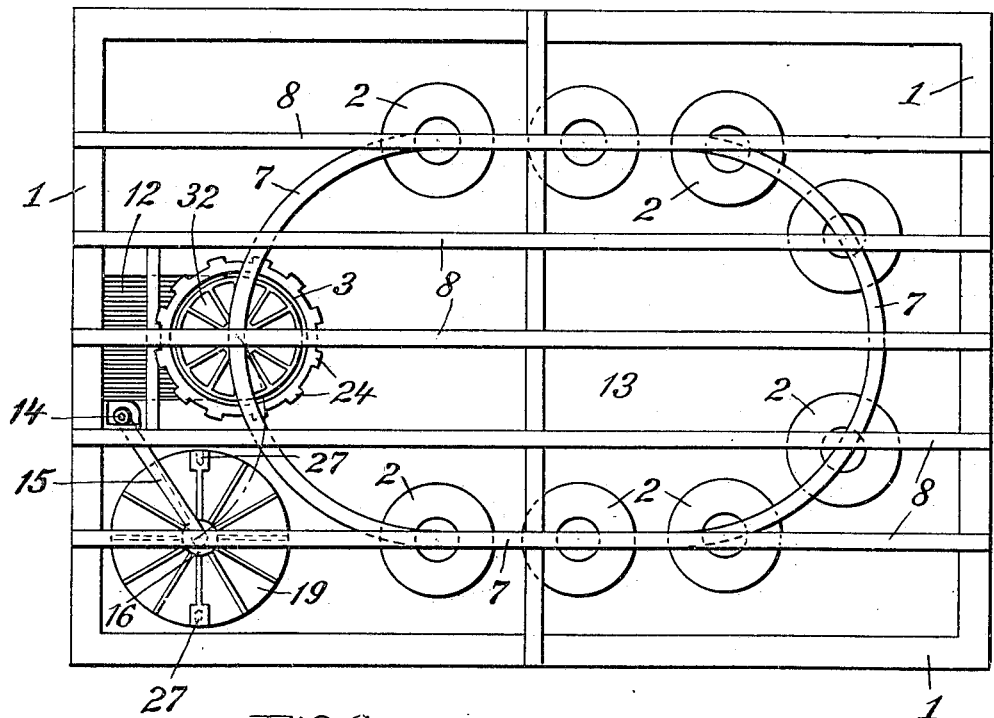

No. 758,865. PATENTED MAY 3, 1904.
E. C. SHAW.
APPARATUS FOR PREPARING, HANDLING, AND VULCANIZING TIRES
OR OTHER RUBBER PRODUCTS.
APPLICATION FILED JUNE 17, 1903.

NO MODEL. 2 SHEETS—SHEET 1.

WITNESSES
Alvin K. Goodwin
Oliver Williams

INVENTOR
Edwin Coupland Shaw
BY
Seward Davis
ATTORNEY

No. 758,865. PATENTED MAY 3, 1904.
E. C. SHAW.
APPARATUS FOR PREPARING, HANDLING, AND VULCANIZING TIRES
OR OTHER RUBBER PRODUCTS.
APPLICATION FILED JUNE 17, 1903.
NO MODEL. 2 SHEETS—SHEET 2.
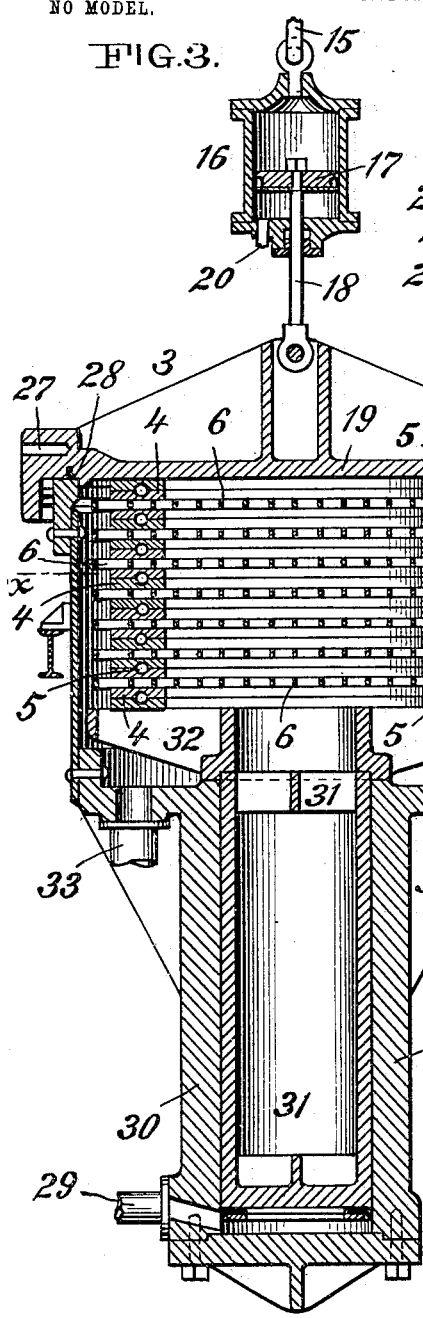
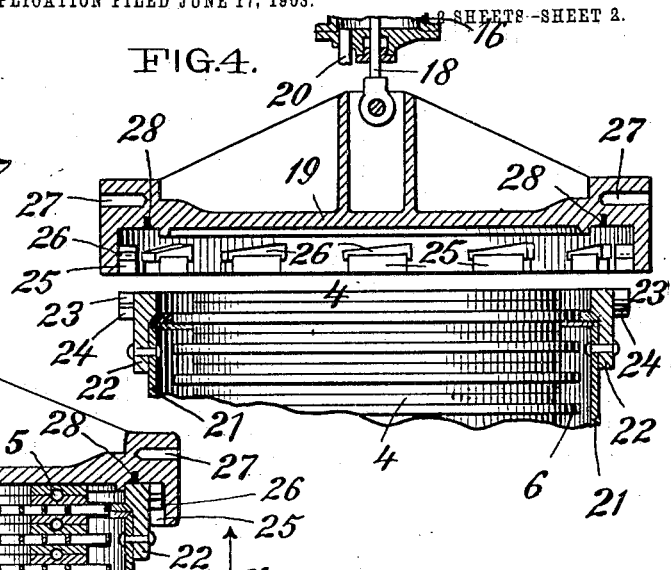
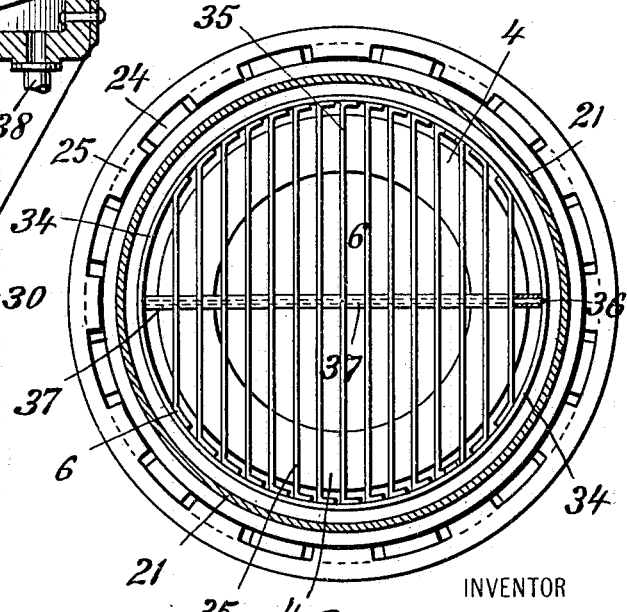
WITNESSES:
Alvin K. Goodwin,
Oliver Williams
INVENTOR
Edwin Copland Shaw
BY Edward Davis
ATTORNEY No. 758,865. Patented May 3, 1904.

UNITED STATES PATENT OFFICE.

EDWIN COUPLAND SHAW, OF AKRON, OHIO, ASSIGNOR TO THE B. F. GOODRICH COMPANY OF OHIO, OF AKRON, OHIO, A CORPORATION OF OHIO.

APPARATUS FOR PREPARING, HANDLING, AND VULCANIZING TIRES OR OTHER RUBBER PRODUCTS.

SPECIFICATION forming part of Letters Patent No. 758,865, dated May 3, 1904.

Application filed June 17, 1903. Serial No. 161,888. (No model.)

*To all whom it may concern:*

Be it known that I, EDWIN COUPLAND SHAW, a citizen of the United States of America, residing at the city of Akron, county of Summit, and State of Ohio, have invented certain new and useful Improvements in Apparatus for Preparing, Handling, and Vulcanizing Tires or other Rubber Products, of which the following is a specification.

This invention has for one object to save time and labor in preparing and handling heavy vulcanizing-molds adapted to receive uncured vehicle-wheel tires or other rubber structures.

Further objects are to save factory-space and to promote greater convenience and economy of operation and improve the quality of the vulcanized-rubber product.

The invention comprises the combination in coöperative relation of mold tables or supports, a series of vulcanizing-molds in which to build up the green tires or other rubber products at said tables, an adjacent vertically-disposed vulcanizer having a ram or follower and an opposed removable cover, between which the filled molds are compressed during vulcanization of their contents, and one or more traveling hoists adapted to transfer the filled molds from the tables to the vulcanizer and to remove the molds and interposed gratings therefrom after vulcanization of the rubber products is effected in the molds while under pressure of the ram and then return the cooled molds to the tables for removal of the vulcanized products and cleaning and refilling of the molds. The tables and the vulcanizer and the track for the traveling hoist are arranged, preferably, in a general elliptical or rounding path, whereby factory-space is utilized to the best advantage.

The invention also includes a special arrangement of the vulcanizer-cover relatively to the vulcanizer-body and to a swinging crane, whereby this cover may be readily unlocked while connected to the crane-hoist, which then may lift the cover to allow the crane to swing it to one side to admit the molds to the vulcanizer and permit their removal therefrom.

The invention also includes various details of construction of the apparatus, all as hereinafter described and claimed.

Reference is made to the accompanying drawings, forming part of this specification, and in which—

Figure 2:
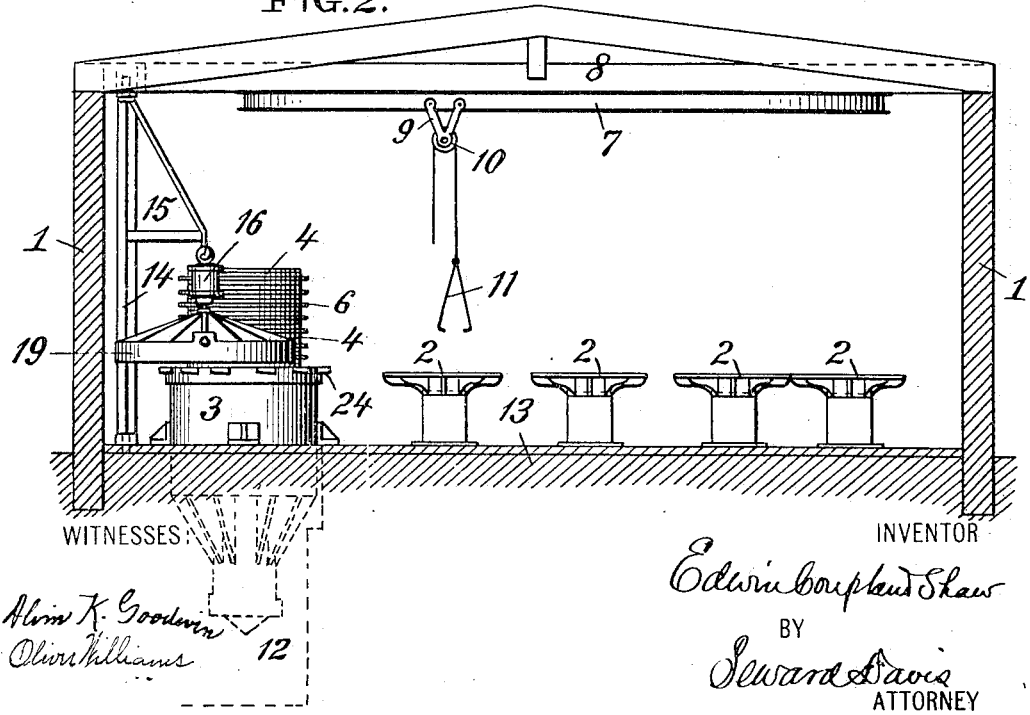

Figure 1 is a plan view showing my improved apparatus with the vulcanizing-press cover lifted and swung to one side by the crane to permit charging of molds into and discharging of them from the vulcanizer, the roofing of the factory building being removed. Fig. 2 is a vertical sectional elevation showing the apparatus of Fig. 1 and with a stack of molds resting on the raised press-ram. Fig. 3 is an enlarged vertical sectional view of the vulcanizing-press shown closed and with a series of tire-holding molds with interposed gratings confined between the press-ram and the locked cover of the vulcanizer. Fig. 4 is a detail vertical sectional view showing the press-cover lifted by the crane-hoist prior to swinging the cover to one side by the crane, and Fig. 5 is a sectional plan view taken on the line $x\ x$ in Fig. 3 and with the parts appearing as viewed from below in direction of the arrow.

In any suitable factory-building 1 are set up a series of tables 2 and a vulcanizing apparatus, preferably made as a vulcanizing-press 3. In this instance the tables 2 are shown circular in form to promote most convenient building up of rubber stock in a series of annular molds 4, each adapted to hold an endless vehicle-wheel tire 5. There are preferably as many tables 2 as the vulcanizing-press has capacity for molds. The press shown may receive eight molds 4, with metal gratings 6 interposed between them. Hence there are eight mold-supporting tables. These tables and the vulcanizing-press are disposed, preferably, in an elliptical or rounding path coincident with an overhead track 7, fastened to beams 8. This track sustains and guides a traveling hoist apparatus of any approved construction, which moves along or around the track in a path above the centers of the mold-tables 2 and the vulcanizing-press 3.

This traveling hoist is preferably made with a wheeled carriage 9, running on the track 7, and a pulley-block and chain hoist 10 of any approved construction held to the carriage and having on its chain suitable grapples 11, whereby it may lift the molds 4 and permit their safe transfer by the carriage from the tables 2 to the press 3 and back again to the tables. The press is partly sunken in a pit 12 to bring its open end at most convenient mold charging and discharging level relatively to the floor 13 and the tables 2.

Near the vulcanizing-press 3 is set up a crane 14, the post of which turns on vertical pivots to allow the braced crane-arm 15 to turn horizontally with its extremity over the center of the vulcanizing-press 3. From the crane-arm is suspended a suitable pneumatic or steam hoist 16, having a piston 17 whose rod 18 is connected to the heavy cover 19 of the press 3. A pipe 20 assures inlet and outlet of steam or air to and from the hoist-cylinder below its piston 17 to provide for raising and lowering the press-cover by the piston.

To the top of the press-body 21 is fixed a steel ring 22, having a series of spaced horizontal lugs 23, provided with inclined bottom faces preferably produced on hard-steel wedges 24, fixed to the lugs, and there is on the cover-flange a corresponding series of spaced lugs 25, having inclined faces preferably formed on hard-steel wedges 26, fixed to their upper faces. When the removed cover 19 is lowered to carry its lugs and wedges 25 26 down between and below the press-body lugs and wedges 23 24, the cover is turned a little horizontally in one direction to interlock its wedges or inclined faces with or beneath the press-body wedges or inclined faces, and a slight turning of the cover in the opposite direction will unlock it by disengaging the wedges or inclines and will also carry the two series of lugs out of register to permit the cover to be again lifted and swung sidewise and clear of the press by the crane. The piston 17 turns in the crane-hoist cylinder, thereby providing a swiveling connection between the crane-hoist and the press-cover, which permits the above-named horizontal turning of the cover in opposite directions to lock it to and unlock it from the press-body while the cover remains connected to or suspended from the crane-hoist. The cover thus may be turned horizontally by the aid of hand-bars inserted in holes 27, formed at its opposite edge portions, or by any suitable rack-and-pinion gearing or otherwise. A suitable steam-packing ring 28 is provided between the press-cover 19 and the steel ring 22 on the press-body. Any other approved means which will permit the press-cover to be tightly locked and unlocked by horizontal rotative movements and to be raised and lowered by the crane-hoist may be adopted instead of the preferred opposing series of inclined or wedging lugs above described.

A pipe 29 admits water to and permits escape of it from the press-cylinder 30 for operating the press-ram 31, which has a spider-formed head 32, permitting free circulation through it of the steam or other heating medium used in the vulcanizing process. Another pipe, 33, admits water for cooling the molds in the press-body and may also drain the water from the cooled molds, the spider ram-head 32 permitting free circulation of water during this mold-cooling process. The gratings 6 permit free steam and water circulation around the molds and are preferably made with an endless metal rim or hoop 34 and cross-bars 35, bolted at their ends to the rim and stayed centrally by a bolt 36, on which between the bars and the rim are placed a series of short spacing-tubes 37, as more clearly shown in Figs. 3 and 5 of the drawings. The press has the usual steam-gage and thermometer. (Not necessary to be shown or described.)

The coöperation of combined or related parts of this apparatus is as follows: Assuming that the press-cover 19 is raised and swung to one side by the crane-hoist 14 20, as shown in Figs. 1 and 2 of the drawings, and that the molds 4 are filled with tires 5 or other green-rubber products at the tables 2, said molds are lifted from the tables by the traveling hoist 9 11 and are transferred thereby along the track 7 to the vulcanizing-press 3 and are deposited on the press ram-head 32 in a stack, with gratings 6 interposed between them. The molds and gratings may be stacked on the fully-raised ram 31 32, or they may be piled up as the ram is gradually lowered step by step, the uppermost mold finally resting a little below the level of the open top of the press-body. The crane-hoist 14 20 is now swung around to carry the cover 19 over the the press, whereon it is lowered by the hoist 16 until the cover-wedges 26 pass below the level of the press-body wedges 24, and the cover now is turned horizontally by hand-bars inserted in its holes 27 for locking it to the press-body by engagement of the two sets of wedging or inclined surfaces, as hereinbefore described. The press-ram 31 32 now is raised by pressure of water admitted at pipe 29 to clamp the whole series of molds and intervening gratings between the ram and the locked press-cover 19, and thereby hold the molds tightly closed. Steam now is admitted through a pipe 38 and will freely circulate in the press-body and through the spider ram-head 32 and the gratings 6 and around all parts of the molds 4 to facilitate quick, thorough, and uniform vulcanization of the tires or other rubber products in the molds. When vulcanization is effected, the steam is shut off, and water is admitted through the pipe 33 to flood and cool the molds, and the ram then is relieved of pressure, and the water is drained off through the pipe 33, and the cover 19 is turned reversely a sufficient distance to unlock its engaged wedges from the wedges on the press-body, whereupon the cover is again lifted by the crane-hoist 16 and swung to one side by the crane to the first-described position. (Shown in Figs. 1 and 2 of the drawings.) The gratings 6 and the spider ram-head 32 will accommodate molds of varying diameters and will assure free steam and water circulation through them and all around the molds during the vulcanizing and cooling processes above mentioned. The cooled molds and interposed gratings now are taken from the press by the traveling hoist apparatus 9 11, the molds being thereby returned to the tables 2, where the vulcanized tires or products are removed and the molds are cleaned and then again filled with green-rubber products ready to be transferred to the press 3 for vulcanization therein, substantially as above described.

There may be two or more of the traveling hoists 9 11, all running on the track 7 to provide for the quickest possible charging and discharging of the molds at the vulcanizing-press. This traveling hoist apparatus enables the molds 4 and gratings 6 to be handled readily in laying them in and removing them from the press.

By the aid of this complete correlated apparatus I am able to handle many heavy molds with interposed gratings and thoroughly and uniformly to vulcanize the tires or other rubber products with economy of time, space, and labor. I also am able to vulcanize the contents of any number of molds up to the full mold capacity of the press. By vulcanizing the rubber products in the whole series or charge of molds in one open press-chamber with gratings interposed between the molds I am able to secure more uniformly good results in quick vulcanization than are possible when a number of molds are clamped directly together in a vulcanizer and without steam and water circulating gratings interposed between them or when a number of separate steam-heated chambers clamping the molds between them are employed.

I have made a separate patent application, which is a division of this one and has Serial No. 161,886, filed June 17, 1903, and more particularly includes the special construction of the vertically-disposed vulcanizing-press, which is herein shown and described as part of a complete apparatus included within the scope of the appended claims.

It is obvious that any means other than fluid-pressure may be employed to operate a ram or follower in a vertically-disposed vulcanizer adapted to be charged with and discharged of a series of molds manipulated at the tables 2 and handled by the carriage 9 and hoist 10, as above described. A vertically-disposed vulcanizer having a fluid-operated ram is preferred, because the readily-controlled or somewhat yielding pressure of this ram on a mold or series of molds confined between said ram and the press-cover compensates change in mass of the rubber stock while the tires or other rubber products are being cured in the steam or heating chamber of the vulcanizer and assures constant proper closure of the molds without requiring time-consuming and expensive bolting together of their halves or parts. The gratings preferably used between the molds are each readily handled as one piece, which can be very quickly adjusted in or removed from the heating-chamber of the vulcanizer. Whether the gratings be used or not the molds are held closed by pressure applied over their whole upper and lower areas. Hence there is practically no danger of the molds buckling or bursting under internal pressures arising from expanding or flowing rubber or from the externally-applied pressure of the ram.

It is not essential that the mold-tables be arranged in a generally rounded or elliptical path relatively to a vertically-disposed vulcanizer or vulcanizing-press; but such particular rounded or elliptical grouping of the mold-tables and corresponding rounded course of the mold-carriage tracks has special advantages in facilitating manipulation of the molds and interposed gratings relatively to the vulcanizer to provide for convenient large output of vulcanized wheel-tires or other rubber products within a comparatively small factory-space.

I claim as my invention—

1. Apparatus of the character described, comprising mold tables or supports, vulcanizing-molds in which to build up uncured tires or rubber products at said tables, a vertically-disposed vulcanizer having a removable cover, a track above the tables and vulcanizer, and a traveling hoist running on said track and adapted to transfer filled molds from the tables to the vulcanizer and to remove the molds from the vulcanizer and return them to the tables.

2. Apparatus of the character described, comprising mold tables or supports, vulcanizing-molds in which to build up uncured tires or rubber products at said tables, a vertically-disposed vulcanizer having a removable cover, a crane adapted to adjust the cover to and remove it from the vulcanizer, a track above the tables and vulcanizer, and a traveling hoist running on said track and adapted to transfer filled molds from the tables to the vulcanizer and to remove the molds from the vulcanizer and return them to the tables.

3. Apparatus of the character described, comprising mold tables or supports, vulcanizing-molds in which to build up uncured tires or rubber products at said tables, a vertically-disposed vulcanizer having a removable cover; said mold-tables and vulcanizer being arranged in a general elliptical or rounding path, a corresponding elliptical or rounding track arranged above the mold-tables and vulcanizer, and a traveling hoist running on said track and adapted to transfer filled molds from the tables to the vulcanizer and to remove the molds from the vulcanizer and return them to the tables.

4. Apparatus of the character described, comprising mold tables or supports, vulcanizing-molds in which to build up uncured tires or rubber products at said tables, a vertically-disposed vulcanizer having a removable cover; said mold-tables and vulcanizer being arranged in a general elliptical or rounding path, a crane adapted to adjust the cover to and remove it from the vulcanizer, an elliptical or rounding track arranged above the mold-tables and vulcanizer, and a traveling hoist running on said track and adapted to transfer filled molds from the tables to the vulcanizer and to remove the molds from the vulcanizer and return them to the tables.

5. Apparatus of the character described, comprising mold tables or supports, vulcanizing-molds in which to build up uncured tires or rubber products at said tables, a vertically-disposed vulcanizer having a removable cover which locks and unlocks by horizontal movement, a crane, a piston-hoist coupling the vulcanizer-cover to the crane and adapted to adjust the cover to and remove it from the vulcanizer and permitting bodily movement of the cover to lock and unlock it, a track above the tables and vulcanizer, and a traveling hoist running on said track and adapted to transfer filled molds from the tables to the vulcanizer and to remove the molds from the vulcanizer and return them to the tables.

6. Apparatus of the character described, comprising mold tables or supports, vulcanizing-molds in which to build up uncured tires or rubber products at said tables, a vertically-disposed vulcanizer having a removable cover which locks and unlocks by horizontal movement; said mold-tables and vulcanizer being arranged in a general elliptical or rounding path, a crane, a piston-hoist coupling the vulcanizer-cover to the crane and adapted to adjust the cover to and remove it from the vulcanizer and permitting bodily movement of the cover to lock and unlock it, an elliptical or rounding track arranged above the mold-tables and vulcanizer, and a traveling hoist running on said track and adapted to transfer filled molds from the tables to the vulcanizer and to remove the molds from the vulcanizer and return them to the tables.

7. Apparatus of the character described, comprising mold tables or supports, vulcanizing-molds in which to build up uncured tires or rubber products at said tables, a vertically-disposed vulcanizer having a removable cover, a series of gratings adapted for interposition between the molds in the vulcanizer, a track above the tables and vulcanizer, and a traveling hoist running on said track and adapted to transfer filled molds from the tables to the vulcanizer and to arrange the gratings therein between the molds and adapted also to remove the molds and gratings from the vulcanizer and return the molds to the tables.

8. Apparatus of the character described, comprising mold tables or supports, vulcanizing-molds in which to build up uncured tires or rubber products at said tables, a vertically-disposed vulcanizer having a removable cover, a crane adapted to adjust the cover to and remove it from the vulcanizer, a series of gratings adapted for interposition between the molds in the vulcanizer, a track above the tables and vulcanizer, and a traveling hoist running on said track and adapted to transfer filled molds from the tables to the vulcanizer and to arrange the gratings therein between the molds and adapted also to remove the molds and gratings from the vulcanizer and return the molds to the tables.

9. Apparatus of the character described, comprising mold tables or supports, vulcanizing-molds in which to build up uncured tires or rubber products at said tables, a vertically-disposed vulcanizing-press having an interior ram or follower and a removable cover between which ram and closed cover the molds are subjected to pressure during vulcanization, a track above the tables and vulcanizer, and a traveling hoist running on said track and adapted to transfer filled molds from the tables to the vulcanizer and to remove the molds from the vulcanizer and return them to the tables.

10. Apparatus of the character described, comprising mold tables or supports, vulcanizing-molds in which to build up uncured tires or rubber products at said tables, a vertically-disposed vulcanizing-press having an interior ram or follower and a removable cover, a series of gratings adapted for interposition between the molds in the vulcanizer while the molds are subjected to pressure between the press-ram and closed cover during vulcanization, a track above the tables and vulcanizer, and a traveling hoist running on said track and adapted to transfer filled molds from the tables to the vulcanizer and to arrange the gratings therein between the molds and adapted also to remove the molds and gratings from the vulcanizer and return the molds to the tables.

11. Apparatus of the character described, comprising mold tables or supports, vulcanizing-molds in which to build up uncured tires or rubber products at said tables, a vertically-disposed vulcanizing-press having an interior fluid-operated ram and a removable cover between which ram and closed cover the molds are subjected to pressure during vulcanization, a track above the tables and vulcanizer, and a traveling hoist running on said track and adapted to transfer filled molds from the tables to the vulcanizer and to remove the molds from the vulcanizer and return them to the tables.

12. Apparatus of the character described, comprising mold tables or supports, vulcanizing-molds in which to build up uncured tires or rubber products at said tables, a vertically-disposed vulcanizing-press having an interior fluid-operated ram and a removable cover, a series of gratings adapted for interposition between the molds in the vulcanizer while the molds are subjected to pressure between the press-ram and closed cover during vulcanization, a track above the tables and vulcanizer, and a traveling hoist running on said track and adapted to transfer filled molds from the tables to the vulcanizer and to arrange the gratings therein between the molds and adapted also to remove the molds and gratings from the vulcanizer and return the molds to the tables.

13. A vertical vulcanizing-press having an interior ram or follower and a removable cover, combined with a crane adapted to swing the cover aside bodily, and means for charging molds into and discharging them from the press at and from its top.

14. A vertical vulcanizing-press having an interior ram or follower and a removable cover, combined with a crane having a hoist adapted to lift the cover and allow the crane to swing it aside bodily from and to the press, and means for charging molds into and discharging them from the press at and from its top.

15. A vertical vulcanizing-press having an interior ram or follower and a removable cover which locks and unlocks by horizontal movement, combined with a crane having a hoist provided with a piston coupled to the cover and permitting movement of the suspended cover to lock and unlock it, said crane and hoist being adapted to lift the unlocked cover and swing it aside bodily from and to the press, and means for charging molds into and discharging them from the press at and from its top.

16. A vertical vulcanizing-press having an interior ram or follower and a removable cover, combined with a crane adapted to swing the cover aside bodily, a series of bodily-movable gratings adapted for interposition between molds placed in the vulcanizer, and means for charging the molds and gratings into and discharging them from the press at and from its top.

17. A vertical vulcanizing-press having an interior ram or follower and a removable cover, combined with a crane having a hoist adapted to lift the cover and allow the crane to swing it aside from and to the press, a series of bodily-removable gratings adapted for interposition between molds placed in the vulcanizer, and means for charging the molds and gratings into and discharging them from the press at and from its top.

18. A vertical vulcanizing-press having an interior ram or follower and a removable cover which locks and unlocks by horizontal movement, combined with a crane having a hoist provided with a piston coupled to the cover and permitting movement of the suspended cover to lock and unlock it, said crane and hoist being adapted to lift the unlocked cover and swing it aside bodily from and to the press, a series of bodily-removable gratings adapted for interposition between molds placed in the vulcanizer, and means for charging the molds and gratings into and discharging them from the press at and from its top.

19. A vertical vulcanizing-press having a bodily-removable cover, an interior fluid-operated ram adapted to clamp molds between it and the closed cover with a pressure-compensating change in mass of the rubber products in the molds during vulcanization, a series of bodily-removable gratings adapted for interposition between molds placed in the vulcanizer, and means for charging the molds and gratings into and discharging them from the press at and from its open top.

20. A vertical vulcanizing-press having a bodily-removable cover, an interior fluid-operated ram having a skeleton or perforated head giving fluid circulation through it and adapted to clamp molds between it and the closed cover with a pressure-compensating change in mass of the rubber products in the molds during vulcanization, a series of bodily-removable gratings adapted for interposition between molds placed in the vulcanizer, and means for charging the molds and gratings into and discharging them from the press at and from its open top.

21. A vertical vulcanizing-press having a bodily-removable cover provided at its inner face with ribs or projections forming fluid-passages, an interior fluid-operated ram adapted to clamp molds between it and the closed cover with a pressure-compensating change in mass of the rubber products in the molds during vulcanization, a series of bodily-removable gratings adapted for interposition between molds placed in the vulcanizer, and means for charging the molds and gratings into and discharging them from the press at and from its open top.

22. A vertical vulcanizing-press having a bodily-removable cover provided at its inner face with ribs or projections forming fluid-passages, an interior fluid-operated ram having a skeleton or perforated head giving fluid circulation through it and adapted to clamp molds between it and the closed cover with a pressure-compensating change in mass of the rubber products in the molds during vulcanization, a series of bodily-removable gratings adapted for interposition between molds placed in the vulcanizer, and means for charging the molds and gratings into and discharging them from the press at and from its open top.

23. A vertical vulcanizing-press having a removable cover, an interior fluid-operated ram adapted to clamp molds between it and the closed cover with a pressure-compensating change in mass of the rubber products in the molds during vulcanization, and a series of gratings adapted for interposition between molds placed in the vulcanizer, combined with a crane having a hoist adapted to lift the cover and allow the crane to swing it aside bodily, and means for charging the molds and gratings into and discharging them from the press at and from its open top.

24. A vertical vulcanizing-press having a removable cover which locks and unlocks by horizontal movement, an interior fluid-operated ram adapted to clamp molds between it and the closed cover with a pressure-compensating change in mass of the rubber products in the molds during vulcanization, and a series of gratings adapted for interposition between molds placed in the vulcanizer, combined with a crane having a hoist provided with a piston coupled to the cover and permitting movement of the suspended cover to lock and unlock it, said crane and hoist being also adapted to lift the unlocked cover and swing it aside bodily, and means for charging the molds and gratings into and discharging them from the press at and from its open top.

EDWIN COUPLAND SHAW.

Witnesses:
ALVIN K. GOODWIN,
OLIVER WILLIAMS.